Feb. 28, 1967 J. BUSSI ETAL 3,306,571
GATE-VALVE
Filed April 27, 1964 3 Sheets-Sheet 1

INVENTORS
JEAN BUSSI
MAURICE LECHEVALLIER
BY Bacon & Thomas
ATTORNEYS

INVENTORS
JEAN BUSSI
MAURICE LECHEVALLIER
BY
Bacon & Thomas
ATTORNEYS

Feb. 28, 1967  J. BUSSI ETAL  3,306,571
GATE-VALVE
Filed April 27, 1964  3 Sheets-Sheet 3

INVENTORS
JEAN BUSSI
MAURICE LECHEVALLIER
BY Bacon & Thomas
ATTORNEYS

United States Patent Office 3,306,571
Patented Feb. 28, 1967

3,306,571
GATE-VALVE
Jean Bussi, Sceaux, and Maurice Lechevallier, Viry-Chatillon, France, assignors to Commissariat à l'Energie Atomique, Paris, Seine, France
Filed Apr. 27, 1964, Ser. No. 363,020
Claims priority, application France, May 13, 1963, 934,621
7 Claims. (Cl. 251—62)

The present invention relates to a gate-valve, and more particularly a gate-valve comprising an obturating member which is adapted to move within a conduit so as to close off this latter at will irrespective of the direction of the forces exerted on said obturating member by the fluid which is present within said conduit.

The gate-valve according to the invention can especially, although not exclusively, be applied to those installations which are occupied by fluids under pressure and which are divided into sections which it is necessary to be able to isolate from each other for the purpose, for example, of permitting depressurization and repair of a defective section while maintaining the remainder of the installation under pressure. Each of the gate-valves which separate two sections of this type can therefore be subjected to pressure forces which are in opposite directions, depending on the section which is depressurized. Such an arrangement is frequently met with in the coolant gas circuits of nuclear reactors; such circuits comprise a number of parallel branch-pipes and it must be made possible for each of these latter to be isolated from the others and depressurized without thereby entailing general depressurization of the reactor.

Up to the present time, this problem had been solved either by the use of valves in which the valve diaphragm was movable transversely to the conduit so as to obturate either one or the other of the two valve seats provided in this latter at an interval which is slightly greater than the thickness of the diaphragm, or else by the use of valves provided with two flaps which are capable of rocking in opposite directions in such a manner that either one or the other is applied against a single valve seat having two bearing surfaces.

These two arrangements are both subject to disadvantages. The first is extremely cumbersome since the clearance required at the level of the valve body must have a height which is at least equal to the diameter of the diaphragm. The second arrangement is costly on account of the duplication of the entire moving system (obturator flap and operating mechanism) and imposes on the flow a high pressure drop in the open position.

The present invention is directed to the design concept of a double-sealing shut-off valve which meets practical requirements in a more effective manner than valves of the prior art and which, in particular, is not attended by the drawbacks noted above and ensures reliable operation.

The invention is characterized in that a shut-off valve comprises a valve body having two coaxial annular seats located symmetrically at a predetermined axial distance from each other, a single obturator flap which can be applied axially and in leak-tight manner against either one or the other of said two valve-seats and means for guiding and operating the flap so as to permit this latter to move between a position in which it is located parallel to the axes of both valve seats and one of the positions in which it is brought to bear against one valve seat, said means being adapted to impart to said flap a movement of translation which is substantially at right angles to the valve seats at least at the time of application of said flap against a valve seat or at the time of release of said flap from said valve seat.

The invention also consists of a certain number of other arrangements which can advantageously be employed in conjunction with the preceding but which can also be employed independently thereof. All these arrangements will be more readily understood by perusal of the following description taken in reference to the accompanying drawings in which two forms of embodiment of the invention are shown by way of non-limitative example.

Figure 1:
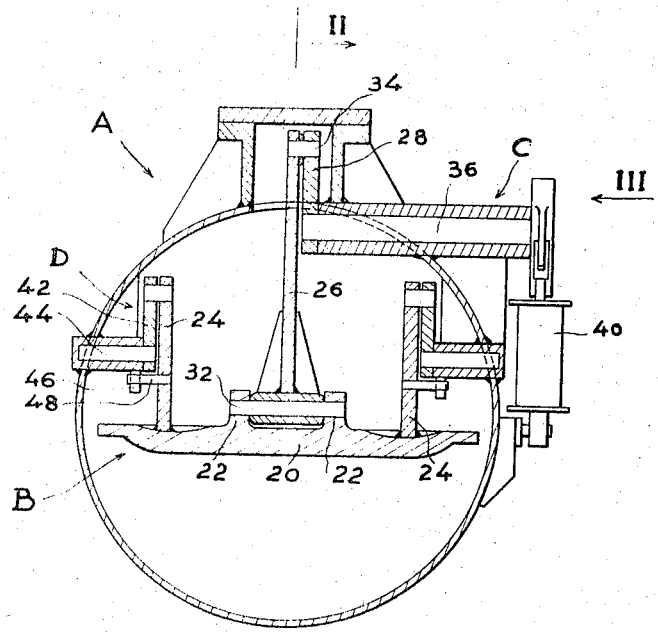
FIG. 1 shows a shut-off valve which constitutes a first form of embodiment of the invention, as shown in cross-section in planes which are transverse to the axis and chosen for the purpose of showing the elements with a maximum of clarity, the component parts being shown in the position which they occupy when the valve is open.
Figure 2:
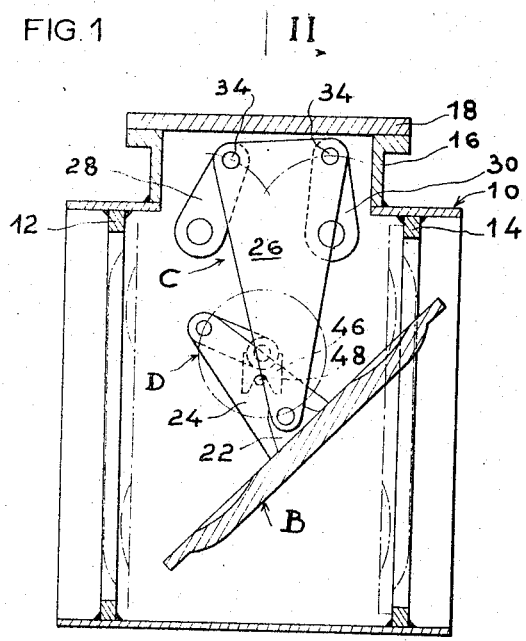
FIG. 2 is a view in cross-section taken along the plane II—II of FIG. 1, the component parts being shown in the position which they occupy when the valve is in the course of closing.
Figure 3:
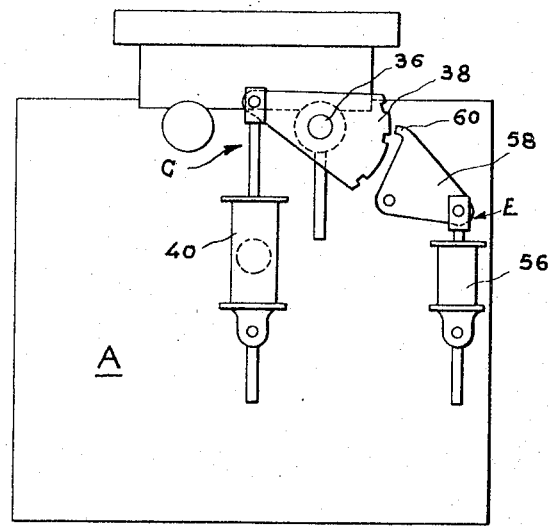
FIG. 3 illustrates the valve looking from the exterior in the direction of the arrow III of FIG. 1.
Figure 4:
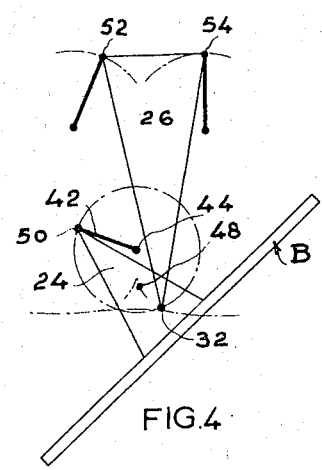
FIG. 4 is a diagram which illustrates the kinematics of operation of the valve of FIG. 1.
Figure 7:
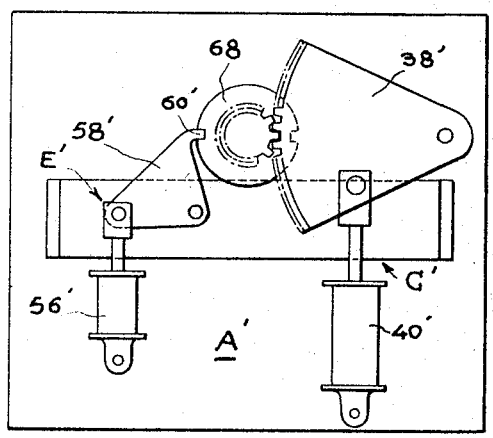
Figure 8:
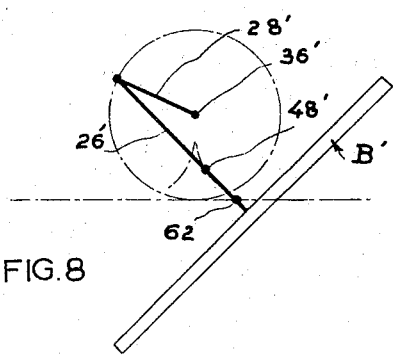
Figure 5:
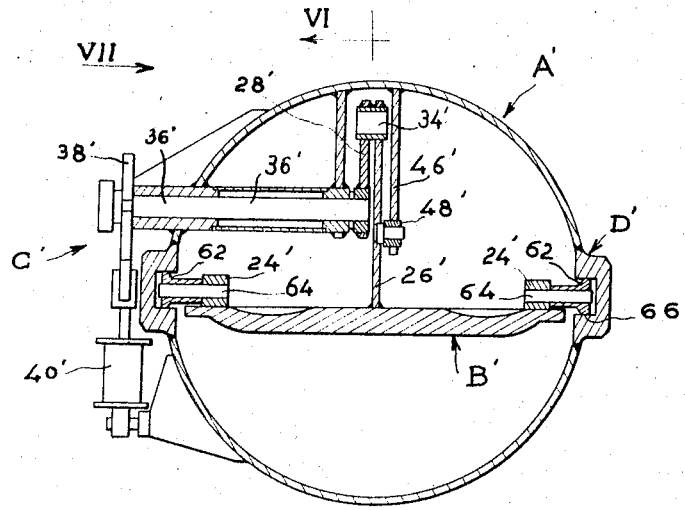
Figure 6:
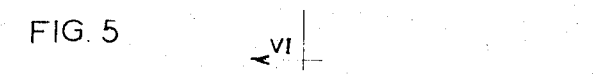

FIG. 5, which is similar to FIG. 1, shows a valve which constitutes another form of embodiment of the invention;

FIG. 6, which is similar to FIG. 2, is a view in cross-section taken along the line VI—VI of FIG. 5;

FIG. 7, which is similar to FIG. 3, illustrates the valve looking from the exterior in the direction of the arrow VII of FIG. 5; and FIG. 8 which is similar to FIG. 4, is a diagram illustrating the kinematics of operation of the valve of FIG. 5.

For the sake of greater clarity, the valve which is illustrated in FIGS. 1 to 4 will be arbitrarily considered as consisting of a valve body A, a flap B, a mechanism C for operating said flap and a mechanism D for guiding said flap, and all these elements will be described hereinafter in turn.

The valve body A can consist simply of a pipe-section 10 in which are fixed, for example by welding, two valve seats 12 and 14, the opposite faces of which are machines so as to provide the obturator flap B with a suitable bearing surface. O-ring seals which have not been shown in the drawings can be fitted in grooves formed in the valve seats so as to ensure leak-tightness.

The pipe-section 10 is provided with a lateral shell 16 which forms a housing for a portion of the operating mechanism C. Said housing is closed in leak-tight manner by a removable plate 18 which permits of access to the valve for the purpose of any repair or maintenance work which may be necessary.

The flap B consists of a single plate 20 provided with a plane bearing surface which is intended to be applied against the valve seats 12 and 14, the said plate being provided with two lugs 22 for coupling said plate to the operating mechanism C and with two added arms 24 for coupling said plate to the guiding mechanism D.

The operating mechanism C consists of a triangular arm 26 which is coupled by means of an articulation to the lugs 22 of the flap 20 and to two crank-arms 28 and 30 (as shown in FIG. 1). The articulation between the lugs of the flap and the arm 26 is constituted by a pin 32 which is at right angles to the axis of the body A and which is secured to the bottom portion of the arm while being adapted to rotate within bores which are formed in the lugs 22.

The two crank-arms are coupled together by means of a pin 34 at the upper corners of the arm 26 and one of the crank-arms is secured to a driving shaft 36 which is at right angles to the axes of the valve seats. Said driving shaft passes through the valve body and the extremity thereof carries a plate 38 (as shown in FIG. 3) which is capable of being driven in rotation by a jack 40, the operation of which is controlled by a pneumatic or hydraulic system which has not been shown in the drawings. A device E for locking the plate is advantageously provided for the purpose of locking the valve in the open position or in one of the closed positions, as will be explained hereinafter.

The guiding mechanism D consists of two identical symmetrical assemblies, only one of which (namely the assembly which is shown on the left hand side of FIG. 1) will now be described: each of the aforesaid assemblies comprises one of the arms 24 and a crank 42 which is pivotally mounted on a pin 44 which is at right angles to the axes of the valve seats and pivoted on the crank. The stationary bearing in which the pin 44 rotates is fitted with a fork-shaped member 46 for the purpose of guiding a stud 48 which is carried by the arm 24 and the function of which will appear hereinafter.

The operating and guiding mechanisms can be represented diagrammatically in the form which is shown in FIG. 4: the flap B is coupled by means of an articulation system to a crank 42 which causes the articulation point 50 to follow a path which describes a full circle as represented in chain-dotted lines in FIGS. 2 and 4; the flap B is also coupled by means of an articulated arm 26 to two driving link-rods which cause the articulation points 52 and 54 to follow paths which describe circular arcs as shown in chain-dotted lines in FIGS. 2 and 4. The lengths of the cranks and of the arms and the distances between the articulation points are chosen so as to ensure that the pin 32 (as shown in FIGS. 1 and 4) describes substantially a straight line which is parallel to the axis of the conduit, at least at the time of application of the flap against the valve seat or release of said flap from said valve seat, and that the making or breaking of contact between the flap and its seating takes place without any lateral sliding movement.

The locking device which is shown in FIG. 3 consists of a plate 58 which is provided with a tooth 60 and which is caused by a jack to rock between two positions. In that position in which it is shown in FIG. 3, the jack maintains the plate in a position wherein the tooth 60 is moved away from the plate 38, in the periphery of which are formed three notches located at points such that the coincidence of the central notch with the tooth 60 corresponds to the open position of the flap and the coincidence of one of the two lateral notches with said tooth corresponds to one of the two closed positions.

The operation of the valve is apparent from the foregoing description. In order to bring the flap into the closed position starting from the position in which it is shown in FIG. 1, said flap is released by actuation of the jack 56, whereupon the jack 40 is actuated in the appropriate direction. It should be noted, however, that in the open position, the articulations 32, 44 and 50 are in alignment and that, if no guiding system were provided at the outset, the point 32 would not be caused to follow its circular path in one direction rather than in another when the pivotal arm 26 swings over. This risk is eliminated by the incorporation of the stud 48 and its guiding fork 46. It can accordingly be seen that the stud 48 describes from the position which it occupies in the open position two different circular arcs (as shown in chain-dotted lines in FIG. 4) depending on the direction of displacement of the pin 32.

This device, which could be replaced by any other equivalent arrangement, makes the system fully reversible.

When the flap approaches that position in which it is applied against the valve seat (this position being shown in chain-dotted lines in FIG. 2), it can be seen that the path followed by said flap consists substantially of a movement of translation at right angles to the valve seat; the application therefore takes place in a normal manner without any sliding motion which could prove detrimental to leak-tightness and result either in jamming or damage.

The periphery of the plate 38 which is illustrated has the shape of a circular arc; it would also be possible to give it a different profile in such a manner as to form a cam and to thrust back the tooth 60 as it approaches the position of closure, thus performing the function of a damping system.

The second form of embodiment, which essentially differs from the preceding in the flap-guiding mechanism, is illustrated in FIGS. 5 to 8.

For the sake of greater clarity, the corresponding elements of the two forms of embodiment have been given the same reference numerals to which is assigned the prime index in FIGS. 5 to 8.

The valve again comprises a valve body A', a flap B', an operating mechanism C', a guiding mechanism D' and a locking mechanism E'. The valve body A' has a general arrangement which is similar to that of the first valve. The flap B' is distinguished from the flap B, however, in that it is fitted with a single arm 26' which provides a coupling with the operating mechanism and which is stationary instead of being pivotally mounted.

The guiding mechanism D' is reduced to two rollers 62 which are rotatably mounted on shafts 64 fixed in projecting portions 24' and which are disposed substantially along a diameter of the flap. These two rollers are adapted to run in slideways 66 which are formed for this purpose in the wall of the valve body A' parallel to the axis of this latter.

The operating mechanism C' consists of a single crank 28', the radius of which is such that said crank describes a full circle (as shown in chain-dotted lines in FIG. 6) when the flap moves from one of its obturation positions to the other. The said crank is carried by a shaft 36' which traverses the valve body and is provided at the extremity thereof with a plate 38' fitted with a toothed sector. A jack 40' produces the rotation of said plate.

The locking device E' is composed of a jack for operating a rocker plate 58' provided with a tooth 60' and a rotary plate 68 provided with two notches. The plate 68 carries a pinion which engages with the toothed sector of the plate 38' and the reduction ratio is chosen so that the plate 68 effects one full revolution when the flap B' moves from one obturation position to the other.

Provision must be made for a device for initial guiding from the open position which is similar to that of the first form of embodiment. Said device consists of a stud 48' which is carried by the arm 26' and which is engaged in a stationary guiding fork 46' (as shown in FIGS. 5 and 6).

Since the operation of this valve has a certain resemblance to that of the first form of embodiment and is clearly brought out both by the description and by the figures, a description does not therefore appear necessary.

As will be apparent, the invention is not limited to those forms of embodiment which have been illustrated and described and it will be understood that the scope of this invention extends to those alternative forms of either all or a part of the devices and arrangements hereinbefore described which remain within the definition of equivalent mechanical means.

What we claim is:

1. Gate-valve having an obturating member which is adapted to move within a conduit from a longitudinal position to a transverse position so as to effect at will the obturation of said conduit irrespective of the direction of the forces exerted on said obturating member by the fluid which is present within said conduit, said gate-valve comprising a valve body having two coaxial annular seats located symmetrically at a predetermined axial distance away from each other, a single obturator flap which can be applied axially and in leak-tight manner against either one or the other of said two valve seats and means for guiding and operating the flap so as to permit said flap to move between a position in which it is located parallel to the axes of both valve seats and one of the positions in which said flap is applied against one valve seat, said means being adapted to impart to said flap a movement of translation which is substantially at right angles to the valve seats at least at the time of application of said flap against a valve seat or at the time of release of said flap from said valve seat.

2. Gate-valve according to claim 1, wherein said operating means comprise a triangular arm which is pivotally coupled on the one hand to the obturator flap along an axis at right angles to the axis of the valve body and close to a diameter of said flap and on the other hand to two cranks, the axes of articulation of said cranks with said triangular arm and the axes of rotation of said cranks within said valve body being parallel to the axis of articulation of said triangular arm with said flap, at least one of said cranks being adapted to be driven by motor means.

3. Gate-valve according to claim 2, wherein said guiding means which are employed in cooperation with said operating means consist of a guiding arm which is integral with the flap and pivotally attached to a crank which is rotatably mounted on a shaft disposed in parallel relation to the axes of articulation of the driving arm.

4. Gate-valve according to claim 3, wherein said operating means consist of an arm which is integral with the flap and which is pivoted about a shaft disposed at right angles to the axis of the valve body on a crank which is adapted to be driven in rotation by motor means about a perpendicular shaft which is parallel to the axis of articulation and located in the central plane between the two valve seats.

5. Gate-valve according to claim 4, wherein said guiding means which cooperate with said operating means consist of roller means carried by the flap and disposed substantially along that diameter of said flap which is parallel to the axis of rotation of the crank, said roller means being adapted to run in guide members provided in the valve body parallel to the axis of said valve body.

6. Gate-valve according to claim 3 which consists of members for guiding the flap in proximity to the open position thereof, comprising at least one stud carried by the flap and disposed outside the plane of the obturation bearing surface of said flap, and a guide with which said stud is in contact when the flap occupies a position which is close to the fully open position thereof.

7. Gate-valve according to claim 3 which is provided with a locking device comprising a first toothed plate carried by the shaft of the driving crank and a locking member constituted by a second toothed plate carried by the valve body and displaceable between a position in which it releases said first plate and a position in which it engages within one of the notches formed in said plate so as to come into coincidence with said member when the flap occupies its fully open position or one of its closed positions.

No references cited.

M. CARY NELSON, *Primary Examiner.*

H. T. KLINKSIEK, *Assistant Examiner.*